(12) United States Patent
Xu et al.

(10) Patent No.: US 7,752,140 B1
(45) Date of Patent: Jul. 6, 2010

(54) SOFTWARE LICENSE DISTRIBUTION AND BYPASSING

(75) Inventors: Xuejun Xu, Cupertino, CA (US); Juan-Carlos Colosso, Mt. View, CA (US)

(73) Assignee: Adobe Systems INc., San Jose, CA (US)

( * ) Notice: Subject to any disclaimer, the term of this patent is extended or adjusted under 35 U.S.C. 154(b) by 602 days.

(21) Appl. No.: 11/585,559

(22) Filed: Oct. 24, 2006

(51) Int. Cl.
*G06F 21/00* (2006.01)
*G06F 7/04* (2006.01)
*G06F 17/30* (2006.01)

(52) U.S. Cl. ............................... 705/59; 726/2; 726/27
(58) Field of Classification Search .................. 705/59; 726/2, 27
See application file for complete search history.

(56) References Cited

U.S. PATENT DOCUMENTS

| | | | | |
|---|---|---|---|---|
| 5,579,222 A * | 11/1996 | Bains et al. | ................. | 717/167 |
| 5,745,879 A * | 4/1998 | Wyman | ......................... | 705/1 |
| 6,615,191 B1 * | 9/2003 | Seeley | ......................... | 705/54 |
| 6,760,324 B1 * | 7/2004 | Scott et al. | ................. | 370/352 |
| 7,035,918 B1 * | 4/2006 | Redding et al. | ............. | 709/223 |
| 2002/0169625 A1 * | 11/2002 | Yang et al. | ..................... | 705/1 |
| 2004/0088176 A1 * | 5/2004 | Rajamani | ....................... | 705/1 |
| 2005/0132347 A1 * | 6/2005 | Harper et al. | ............... | 717/168 |
| 2007/0026942 A1 * | 2/2007 | Kinsley et al. | ................ | 463/29 |

* cited by examiner

*Primary Examiner*—Calvin L Hewitt, II
*Assistant Examiner*—Nancy T Le
(74) *Attorney, Agent, or Firm*—Chapin IP Law, LLC (57) ABSTRACT

A licensing server source distributes a so-called license configuration file to a client for purposes of enabling operation of a software application installed on a computer. When a user initiates execution of the vendor software for the first time, code associated with the software application accesses the license configuration file for purposes of obtaining authorization (e.g., one or more activation certificates) to operate the software application. Depending on the type of license configuration file forwarded to the respective client, the license configuration file can include either a corresponding activation certificate to operate the software or include an address of a remote source (e.g., address) in which to register and obtain authorization to operate the software application. Enabling retrieval of the activation certificate directly from the license configuration file (as a possible alternative to requiring remote registering and authentication to obtain authorization) enables immediate use of the software application.

24 Claims, 8 Drawing Sheets

SOFTWARE LICENSE DISTRIBUTION AND BYPASSING

RELATED APPLICATIONS

This application is related to United States Patent Applications entitled "SURRENDER AND MANAGEMENT OF SOFTWARE LICENSES," application Ser. No. 11/585,512, "OVERDRAFT LICENSES AND LICENSE DISTRIBUTION," application Ser. No. 11/585,561, "LICENSE DISTRIBUTION," application Ser. No. 11/585,734, all of which are being filed on the same date as the present application (by the common assignee Adobe Systems, Inc.), the entire teachings of all of which are incorporated herein by this reference.

BACKGROUND

Software vendors typically require a purchase of a corresponding software license in order to enable a respective user the right to download, install, and/or use a software application. For example, in a retail setting, a respective user can purchase a CD (Compact Disk) or other type of storage including a software program for downloading onto a respective computer system owned by the user. Such a CD can include a serial number. The serial number provided by the vendor enables downloading and/or installation of the software application stored on the CD.

As an example, when downloading or attempting to execute the software program, a respective installer program for installing the software application on the user's computer system may require the user to input the serial number associated with the CD. Upon receipt of the serial number by the installer program, the installer program sends the serial number over a network to a server managed by the vendor of the software program being downloaded. In general, the vendor's server uses the serial number to track and identify which specific copy of the software application is being downloaded onto a respective computer system. In a different configuration, the serial number is transmitted not by the installer, but by the application itself the first time the application is executed.

In addition to the serial number, the vendor's server may require further input (e.g., a user's, name, address, business, etc.) from a respective user to register the software program for use. After obtaining such information from the user, the server typically provides an authentication code or activation code enabling the respective user to install and/or execute the software program on the user's computer system.

Certain software vendors enable mass distribution of software licenses for large volume customer accounts. Typically, this includes distribution over a publicly accessible server. Users that obtain respective software licenses to operate vendor software typically must register with a remote server as a prerequisite to obtain a respective software license.

SUMMARY

Conventional techniques for distribution of software licenses from a licensing server source suffer from a number of deficiencies. For example, conventional techniques enable a respective customer to place an order for distribution of multiple licenses as discussed above. To obtain a license, a respective client associated with the customer communicates with a licensing server source. Normally, the respective client must register by accessing a website and provide personal information to obtain a software license. In certain cases, having to perform such a routine is unacceptable. For example, the client may be an executive that is not familiar with computers and who does not need the burden of having to obtain a software license via a registration process. In another instance, an unexpected emergency may warrant immediate distribution of a respective license without having to force the client to perform the above-mentioned registration routine to obtain a software license.

Techniques discussed herein deviate with respect to conventional applications such as those discussed above as well as other techniques known in the prior art. For example, certain specific embodiments herein are directed to overcoming deficiencies associated with the above-mentioned techniques and/or other deficiencies in the prior art not mentioned above.

For example, in a general embodiment as described herein, a licensing server source such as a vendor-operated licensing server or a customer-managed licensing server can be configured to distribute software licenses enabling use of a corresponding vendor software application. According to one configuration, a network administrator can initiate distribution of a so-called license configuration file to a client in addition to a software application to be installed on the computer. After installation of the vendor software application on the computer and upon initial execution of the software application by the client, code associated with the software application accesses the license configuration file for purposes of obtaining one or more activation certificates that allow operation of the software application.

Depending on the type of license configuration file forwarded to the respective client, the license configuration file can include a corresponding activation certificate to immediately operate the software (without requiring registration and/or execution of an activation process). As an alternative, the license configuration file can include an address (e.g., a Uniform Resource Locator) of a remote source in which to obtain an activation certificate to operate the software application. Enabling retrieval of the activation certificate directly from the license configuration file (as opposed to requiring remote retrieval and authentication to obtain the activation certificate) alleviates the client from having to perform an activation routine that requires accessing the remote source, providing appropriate personal information to the remote source, and obtaining an activation certificate to operate the software.

Accordingly, embodiments herein contrast with conventional techniques because a respective network administrator facilitates distribution of different types of software licenses. For example, as discussed above, conventional techniques do not enable distribution of different types of software licenses, especially ones in which a software application uses a license configuration file to either retrieve an activation certificate or identify where to obtain a software license to operate the vendor software. Embodiments herein thus enable a customer to distribute different kinds of software licenses to different types of people depending on a type of license configuration file forwarded to the users. As an example, a network administrator can enable forwarding of a license configuration file containing a corresponding software license (e.g., activation certificate) to enable immediate operation of a vendor's software application without further input (e.g., registration) from the user or, alternatively (via forwarding of another type of license configuration file), require that the user visit a respective website to register and/or perform an activation process to obtain a respective software license (e.g., activation certificate).

According to one configuration, the vendor enables distribution of a set of purchased software licenses in which users are required to register (e.g., provide personal information) or perform and activation process to obtain authorization to use the vendor software via a corresponding type of license configuration file. Note that, in certain cases, there is no need to collect personal information to provide the authorization/activation record. Instead, a respective vendor can collect a unique machine identification and, thereafter, provide the activation record.

In addition to the set of purchased software licenses, the vendor can provide a number of "bypass" or Master Exception licenses. As its name suggests, the bypass type of license configuration file enables a respective user to bypass the activation process and immediately obtain authorization (e.g., for a Master Exception license) to use the vendor software. License configuration files supporting distribution of the bypass type licenses include special code for obtaining a software license (e.g., activation certificate) directly from the license configuration file rather than requiring the user to register to obtain the software license from a remote source as discussed above. The standard license configuration file 158 can require the user to register with a respective website to obtain a license.

A vendor can provide a set of one or more Master Exception licenses to a customer that has corresponding users disconnected from any network (internal or external). According to one configuration, the purchased licenses are persistent licenses that enable unlimited use of a respective vendor software application. Use of the bypass license configuration files and Master Exception licenses can also enable restricted software use. For example, the Master Exception licenses may only enable temporary use of the vendor software or enable a limited set of the features in the vendor software.

Note that embodiments herein can include a configuration of one or more computerized devices, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product that has a computer-readable medium including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes a computer readable medium having instructions stored thereon for supporting distribution of license configuration files enabling users to obtain authorization to use vendor software (e.g., one or more different types of software applications). The instructions, when carried out by a processor of a respective computer device, cause the processor to: i) receive a command to distribute a software license to a respective computer system; ii) select a type of license configuration file from multiple types of license configuration files (e.g., a type of license configuration file enabling immediate authorization to use a software application or a type of license configuration file including an address specifying where to obtain authorization to operate the vendor software) to forward to the respective computer system, each of the multiple types of license configuration files requiring the respective computer system to obtain authorization from different respective sources; and iii) distribute the selected type of license configuration file to the respective computer system to enable operation of a corresponding vendor software application on the respective computer system. The numbering of the steps has been added for clarity sake, these steps need not be performed in any particular order.

Other embodiments of the present disclosure include software programs to perform any of the method embodiment steps and operations summarized above and disclosed in detail below.

Also, it is to be understood that the system, method and apparatus herein can be embodied strictly as a software program, as a hybrid of software and hardware, or as hardware alone such as within a processor, or within an operating system or a within a software application. Example embodiments of the invention may be implemented within products and/or software applications such as those manufactured by Adobe Systems, Inc. of San Jose, Calif., USA.

As discussed above, techniques herein are well suited for use in distribution of different types of license configuration files. However, it should be noted that embodiments herein are not limited to use in such applications and that the techniques discussed herein are well suited for other applications as well. Note that each of the different features, techniques, configurations, etc. discussed herein can be executed independently or in combination. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to an example embodiment as described herein, a licensing server or distribution source distributes different types of so-called license configuration files to clients to operate a vendor software application. As its name suggests, the license configuration files include information enabling configuration and operation of vendor software.

For example, when initiating execution of an installed vendor software application, code associated with the software application accesses the license configuration file for purposes of determining what features to enable as well as a source in which to obtain authorization (e.g., a software license such as one or more activation certificates) to operate the software application. Depending on the type of license configuration file forwarded to the respective client, the client may be able to operate the software application immediately without registration or after registering with a licensing server source. For example, the license configuration file can include either a corresponding activation code (e.g., Master Exception license) to immediately operate the software without requiring any registration or, alternatively, include an address of a remote source in which to register and obtain authorization (e.g., an accounted license) to operate the software application. As mentioned, enabling authorization or retrieval of a software license directly from the license configuration file (as a possible alternative to requiring remote registering and authentication to obtain authorization) enables immediate and possibly permanent use of the software application without the delay and burden of registering or activation.

Figure 1:
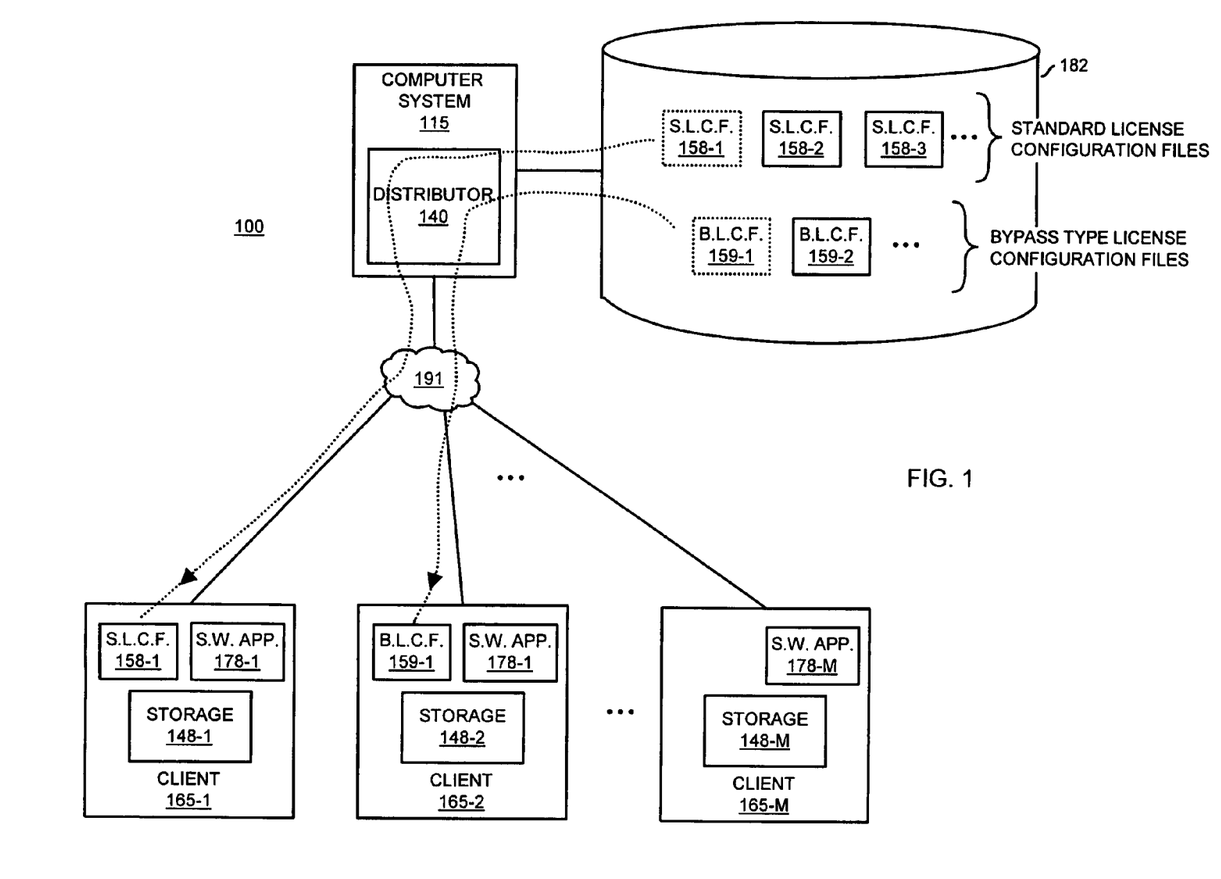
FIG. 1 is an example diagram of a computer network environment enabling distribution of license configuration files according to embodiments herein.

FIG. 1 is an example diagram of a computer network environment 100 for distributing different types of license configuration files according to embodiments herein. As shown, computer network environment 100 includes computer system 115, network 191 (e.g., a customer-managed network, a publicly accessible network such as the Internet, etc.), and clients 165 (e.g., client 165-1, client 165-2, . . . , client 165-M).

Repository 182 stores different types of license configuration files such as standard license configuration files 158 (e.g., standard license configuration file 158-1, standard license configuration file 158-2, standard license configuration file 158-3, . . . ) and bypass license configuration files 159 (e.g., bypass license configuration file 159-1, bypass license configuration file 159-2, . . . ), attributes of which will be discussed later in this specification. Distributor 140 in computer system 115 enables distribution of the license configuration files amongst clients 165. Clients 165 include vendor software application 178 (e.g., vendor software application 178-1, vendor software application 178-2, . . . , vendor software application 178-M) as well as storage 148 (e.g., storage 148-1, storage 148-2, . . . , storage 148-M).

As shown in FIG. 1, distributor 140 distributes different types of license configuration files to clients 165 (e.g., end users such as employees, terminal computer equipment such as a personal computer, etc.). For example, distributor 140 distributes standard license configuration file 158-1 to client 165-1 and bypass license configuration file 159-1 to client 165-2.

Clients 165 can be part of a common business organization that purchases multiple software licenses for distribution to its members. The process of distributing different types of software licenses (e.g., software licenses that require registration as well as software licenses that do not require registration) amongst clients 165 can include distribution of different types of license configuration files. For example, use of the standard license configuration files 158 at a client can require that the respective client 165 (e.g., computer system, computer user, etc.) perform an activation process in order to obtain authorization (e.g., an activation certificate, authorization code, key, etc.) to operate a corresponding vendor software application 178. The activation process can include an action of locking the application to a given machine based on a unique machine identifier. Use of the bypass license configuration files 159 at a client 165 can enable a software license without requiring any registration to obtain authorization to operate the vendor software application 178.

The license configuration files stored in repository 182 can be distributed in any of a number of ways. For example, the users at clients 165 can initiate retrieval of the license configuration files. Alternatively, a network administrator associated with the customer purchasing a set of software licenses can initiate (via a respective command) distribution of the license configuration files over network 191 to the clients 165. Another possibility is that the user in charge of application configuration and installation includes the appropriate license configuraton file with the application installation image copied to clients 165-1 . . . 165-M.

In the context of this latter embodiment in which the network administrator distributes the software licenses based on a respective command to the computer system 115, the distribution distributor 140 receives the command to distribute a type of software license to be distributed or allocated to a respective client (e.g., computer system) in computer network environment 100. Based on a type of license specified by the network administrator, the distributor 140 selects an appropriate type of license configuration file (e.g., either a standard license configuration file 158 or a bypass license configuration file 159) from repository 182 and forwards the appropriate type of license configuration file to the respective client. If the network administrator grants a Master Exception license to a respective client, then the distributor 140 forwards a bypass license configuration file 159 to the client. If the network administrator allocates a standard software license to the client, the distributor 140 forwards the client a standard license configuration file 158 to the client.

The different types of license configuration files can be sent to respective clients 165 as part of a software distribution package including vendor software that supports installation of a respective software application. Accordingly, the distribution package sent to corresponding clients can differ depending on a type of software license allocated for use by a respective client 165. This can be beneficial since it does not require connections to any networks to enable use of respective vendor software.

As will be discussed later in this specification, each of the multiple types of license configuration files prompts the respective client or computer system to obtain authorization from different respective sources. For example, the bypass license configuration file 159 indicates that the received bypass license configuration file 159 is the source to obtain authorization resources. The standard license configuration file indicates a respective remote source in which to register and obtain an authorization resource to operate the vendor software application 178. Distribution of selected types of license configuration files by distributor 140 to the respective clients enables operation of corresponding vendor software in different ways. Note that in addition to distribution of the license configuration files as discussed above, the distributor 140 also can be tasked with transmitting appropriate data to the client 165-1 enabling installation of the vendor software application 178-1 on client 165-1.

As will be discussed, when initiating execution of an installed vendor software application such as vendor software application 178, code associated with the software application 178 accesses a respective license configuration file for purposes of determining what features to enables as well as to obtain authorization (e.g., a software license such as one or more activation certificates) to operate the software application 178. Depending on the type of license configuration file forwarded to the respective client, the client may be able to operate the software application immediately without registration or after registering with a licensing server source.

For example, the network administrator associated with computer network environment 100 can provide "bypass" types of license configuration files including a corresponding activation code (e.g., Master Exception license) to immediately operate the software without requiring any registration by the client 165. Enabling authorization or retrieval of a software license directly from the license configuration file (as a possible alternative to requiring remote registering and authentication to obtain authorization) enables immediate use of the software application without the delay and burden of registering. Alternatively, the network administrator can distribute standard license configuration files to user that will be required to register to obtain a respective software license. The standard license configuration files include an address of a remote source in which to register and obtain authorization (e.g., an accounted license) to operate the software application.

According to the example shown in FIG. 1, client 165-1 receives standard license configuration file 158-1, client 165-2 receives bypass license configuration file 159-1, and client 165-M has not received any license configuration file. As previously discussed, the standard license configuration files 158 requires the respective client to obtain a respective software license based on registration for operating respective vendor software. Accordingly, the client 165-1 must register to obtain a respective software license to operate vendor software application 178-1. This is further discussed with respect to FIG. 2. Bypass license configuration files 159 do not require the client to perform an activation process in order to obtain a respective software license. Accordingly, the client 165-2 can immediately (or with reduced effort) obtain a respective software license to operate vendor software application 178-1. This is further discussed with respect to FIG. 3.

Figure 2:
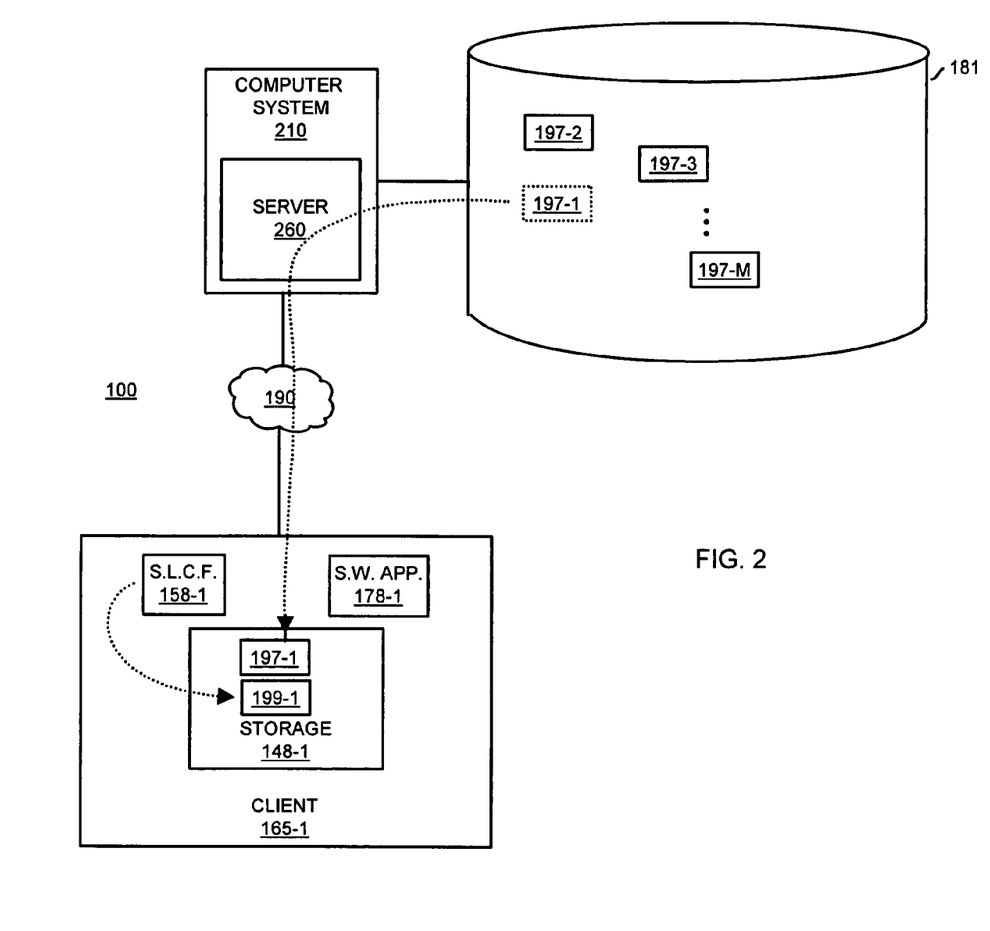
FIG. 2 is an example diagram illustrating how a respective user at a computer system registers to obtain a respective software license according to embodiments herein.

FIG. 2 is an example diagram of a computer network environment 100 enabling clients 165 to perform an activation process and obtain a software license according to embodiments herein. As shown, computer network environment 100 includes computer system 210 (e.g., executing a licensing server source 260), network 190 (e.g., a customer-managed network, a publicly accessible network such as the Internet, etc.), and client 165-1. Client 165-1 includes standard license configuration file 158-1, software application 178-1, and storage 148-1. Storage 148-1 (e.g., a non-volatile repository) stores authorization resource 197-1 and authorization resource 199-1. Repository 181 stores authorization resources 197 (e.g., authorization resource 197-1, authorization resource 197-2, authorization resource 197-3, . . . , authorization resource 197-M. Authorization resources can be packages of one or more data bits enabling operation of vendor software.

Note that the following discussion explains how client 165-1 (or corresponding user) registers and obtains a respective software license to operate vendor software application 178-1. Each of multiple clients 165 in computer network environment 100 that receive a respective standard license configuration file 158-1 can operate in a similar way to obtain authorization to operate software application 178.

For example, a respective user associated with client 165-1 can initiate operation of software application 178-1. To initiate execution of software application 178-1 for the first time (because there is no authorization information such as one or more codes in storage 148-1 to operate software application 178-1), code associated with vendor software application 178-1 accesses (and thus uses) standard license configuration file 158-1 to identify what features to enable as well as a respective source for obtaining one or more authorization codes enabling operation of the vendor software.

As previously discussed, client 165-1 has been allocated a standard license configuration file 158-1 including a respective address in which to obtain a software license for operating software application 178-1. In response to detecting this address, the client 165-1 can prompt a respective user that a software license can be obtained from server 260. Thus, the license configuration file can direct the user to server 260 to obtain a respective software license.

To obtain a respective license, the user at client 165-1 initiates communications with server 260. For example, the user communicates over network 190 to access a web portal supported by server 260. Web portal of server 260 forces the client 165-1 to register in order to obtain a respective software license to operate software application 178-1.

Network 190 can be a customer-managed network such as a private local area network including a customer-managed server that distributes software licenses to its members. Network 190 also can be a publicly accessible vendor-managed server that distributes software licenses on behalf of a respective customer purchasing one or more software licenses for use by its employees or assigns. A customer purchasing the software licenses can dictate whether to enable distribution of software licenses from a server managed by the customer or a respective vendor-managed server available over the Internet.

Upon accessing server 260 (e.g., licensing server source) via the appropriate address specified in the standard license configuration file 158-1, the server 260 prompts the client 165-1 to provide information such as a unique serial number provided by the network administrator to the user, the identity of the software application 178-1 in which the user is attempting to obtain a respective license, and/or unique computer identification information (e.g., fingerprint information) associated with the respective client 165-1.

Based on this retrieved information, the server 260 produces and forwards a respective authorization resource 197-1 (e.g., a software license, a authorization code, activation certificate, key, etc.) over network 190 to client 165-1. The authorization resource 197-1 (as well as other authorization resources 197) can be a key or certificate that is generated at least in part on the information provided by client 165-1 as previously discussed.

Upon receipt over network 190, the client 165-1 stores the authorization resource 197-1 in storage 148-1. According to one embodiment herein, the storage 148-1 is "trusted" storage such as a tamper-resistant or tamper-proof file or storage location associated with the software application 178-1. The storage 148-1 can be hidden or so formed so that a respective user cannot easily find, view, and/or modify its contents.

According to one embodiment, the number of authorization resources 197 stored in repository 181 corresponds with the number of licenses purchased by a respective customer to distribute to its users (e.g., employees). For example, if a customer purchases one hundred licenses, the vendor allocates one hundred authorization resources 197 for storage in repository 181. Thus, the authorization resources 197 can be obtained from a respective vendor providing the corresponding software licenses to use its software applications. As discussed above for one embodiment, the server 260 can modify at least a portion of the authorization resource 197-1 via application of encryption techniques prior to forwarding the authorization resource 197-1 to client 165-1.

In addition to obtaining a respective authorization resource 197-1 from server 260 as previously discussed, the software application can obtain none, one, or more authorization resources (e.g., authorization resource 199-1) directly from standard license configuration file 158-1 for storing in storage 148-1. In an example embodiment, the authorization resource 197-1 retrieved from server 260 and authorization resource 199-1 are both activation certificates. The client 165-1 uses these activation certificates to operate the vendor software application 178-1. In other words, via use of the authorization resource 197-1 and authorization resource 199-1, the user at client 165-1 can launch vendor software application 178-1 to perform functions provided by the software application 178-1 such as edit documents if the software application 178 is a text editor.

Storage 148-1 can retain the authorization resources 197-1 and 199-1 upon shutting down a respective computer system. Upon a subsequent activation of vendor software application 178-1, the vendor software application 178-1 first checks storage 148-1 to obtain the authorization information (e.g., authorization resource 197-1 and authorization resource 199-1) for purposes of operating software application 178-1 again.

If for some reason the information (e.g., authorization resource 197-1 and/or authorization resource 199-1) in storage 148-1 becomes corrupted and does not enable use of vendor software application 178-1, then the user at client 165-1 can be prompted to access server 260 or other appropriate source to repair (or replace) the corrupted authorization information in storage 148-1 of client 165-1. Accordingly, the user can initiate "healing" of the software license (e.g., authorization resources in storage) via re-registration or other relevant process. Repair of the corrupted authorization information enables the respective user at client 165-1 to use the information in storage to operate the software application 178-1 without having to re-register as discussed above.

Figure 3:
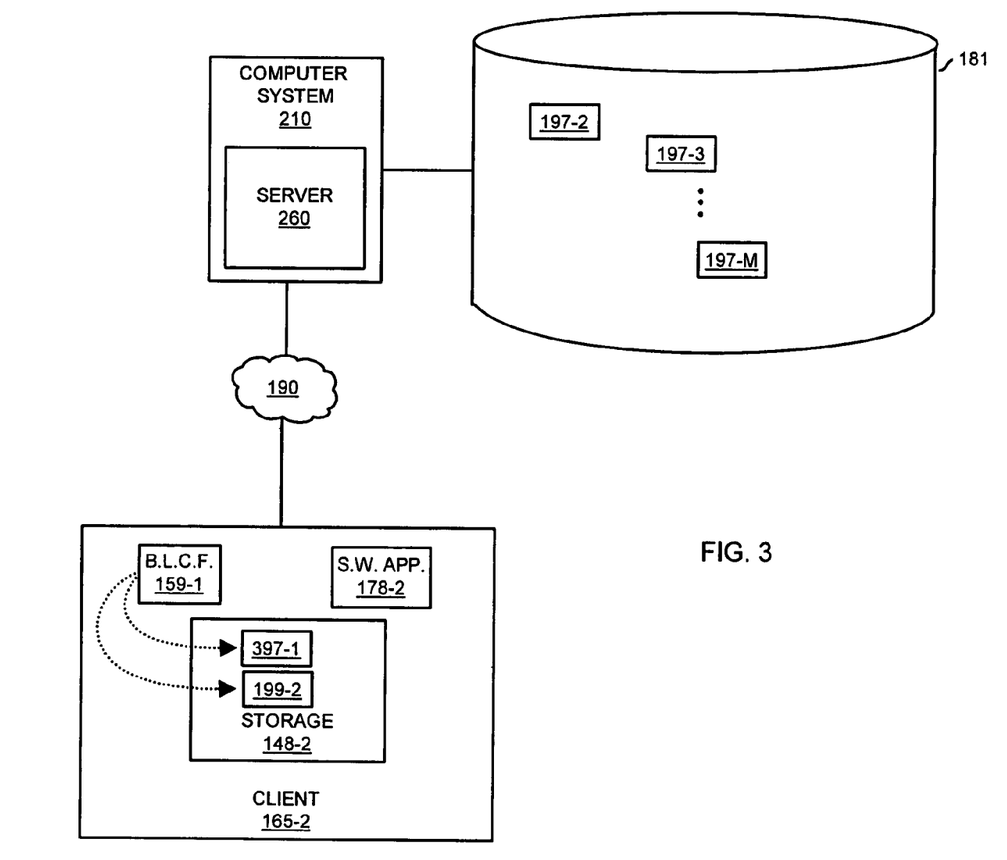
FIG. 3 is an example diagram illustrating how a respective bypass license configuration file provides authorization in lieu of requiring a respective client to obtain an authorization via from a remote source according to embodiments herein.

FIG. 3 is an example diagram of an alternative case illustrating use of a bypass license configuration file 159-1 according to embodiments herein. As shown in this example, the user at client 165-2 need not perform an activation process or register (e.g., provide information such as personal identification information, computer fingerprint information, serial number, etc.) to activate the vendor software application 178-2 as discussed above. Instead, the bypass license configuration file 159-1 includes both authorization resource 397-1 and authorization resource 199-2, both of which may be required to operate the vendor software application 178-2.

Upon an initial activation of vendor software application 178-2, the client 165-2 initiates a retrieval and transfer of authorization resource 397-1 and authorization resource 199-2 to storage 148-2. Thus, in lieu of providing an address to a remote web portal to retrieve an authorization resource as discussed above, the bypass license configuration file 159-1 provides an indication that the source for obtaining the authorization resource 397-1 is stored locally in the bypass license configuration file 159-1 itself. According to one embodiment, both the bypass license configuration files 159 and the standard license configuration file 158 can include similar types of license configuration information. However, the bypass license configuration file 159 can have a corresponding bit set to indicate that the authorization resource is contained in the bypass license configuration file 159 as opposed to being available from a remote source.

According to one configuration, the authorization resource 397-1 can be retrieved from bypass license configuration file 159-1 without any notification to a respective user launching software application 178-2. In such an embodiment, the user can immediately use the software application 178-2 merely because the client 165-2 stores bypass license configuration file 159-1, which makes both the authorization resource 397-1 as well as authorization resource 199-2 readily available for use.

Note that although multiple authorization resources may be required to operate vendor software, other embodiments herein can require only a single authorization resource retrieved from server 260 or a corresponding bypass license configuration file 159.

In possible alternative embodiments, the user at client 165-2 can be instructed to provide a reduced amount of information to obtain the software license stored in the bypass license configuration file. For example, the user can be instructed to provide an appropriate serial number to obtain the authorization resource 397-1.

Regardless of whether access to the authorization resource 397-1 in bypass license configuration file 159-1 requires appropriate input to be accessed, the bypass license configuration files 159 can include information associated with the respective customer to which the Master Exception license has been granted. For example, if an organization purchases one hundred standard software licenses requiring respective users to register in order to obtain appropriate authorization to use vendor software, the vendor may provide ten Master Exception licenses (e.g., bypass license configuration file) for use by the customer. According to one configuration, the Master Exception licenses can be uncounted. Thus, the customer only needs one license configuration file with the Master Exception, and the customer would copy that file when installing SW application 178 to clients 165.

Each of the bypass license configuration files can be "branded" to identify a specific customer making the purchase. In other words, the license configuration files can include specific information identifying that a specific customer is the purchaser of the software licenses or has been granted use of the Master Exception software licenses. If these files happen to be misappropriated and used by entities other than the customer, the vendor will be able to detect the particular customer that was originally allocated the so-called Master Exception licenses. Thus, an audit by the vendor can result in identifying a source (e.g., the name of the customer) that "leaks" the Master Exception licenses to unauthorized users.

Note that the Master Exception license can be restricted in scope. For example, the Master Exception license can allow operation of the vendor software application for only a limited time such as 90 days from the time of first use. As another example, the Master Exception licenses can allow a respective user to launch the application for a predetermined number of times. In yet other embodiments, the Master Exception license can be valid indefinitely but only enable a subset of the features associated with the vendor software application. How to restrict the scope of the Master Exception license may depend on a customer's loyalty, software vendor policy, licensing contracts, and other possible factors. For example, more loyal customers that purchase many software licenses over time can be afforded Master Exception licenses that are less restricted in scope.

According to one configuration, the scope of features available to the respective user and time the respective software license is valid depends on setting information in the respective license configuration files. In other words, the license configuration files codify the terms of the corresponding license provided to the user. Thus, embodiments herein enable a network administrator to authorize or allocate use of a free, limited term software license without having to register with a remote source to obtain an activation certificate to operate the corresponding vendor software application.

In a similar way as discussed above, the client 165-2 stores the authorization resource 397-1 retrieved from bypass license configuration file 159-1 in storage 148-2. According to one embodiment herein, the storage 148-2 is also "trusted" storage such as a tamper-resistant file associated with the software application 178-2. The storage 148-2 can be hidden or so formed that a respective user cannot easily find, view, and/or modify its contents.

In an example embodiment, the authorization resource 397-1 and authorization resource 199-2 retrieved from bypass license configuration file 159-1 are both activation certificates retrieved from bypass license configuration file 159-1 and stored in storage 148-2. In such an embodiment, the client 165-2 uses these activation certificates to operate the vendor software application 178-1 as discussed above. In other words, via use of the authorization resource 397-1 and authorization resource 199-2, the user at client 165-1 can launch vendor software application 178-2 to perform functions provided by the software application 178-2 such as edit photographs if the software application is a photo editor.

Storage 148-2 (e.g., a non-volatile repository) can retain the authorization resources 197-1 and 199-1 even upon shutting down a respective computer system. Upon powering up of a computer system and a subsequent activation of vendor software application 178-1, the vendor software application 178-2 first checks storage 148-2 to obtain the authorization information (e.g., authorization resource 397-1 and authorization resource 199-2) for purposes of operating software application 178-2 again.

If for some reason the information (e.g., authorization resource 397-1 and/or authorization resource 199-2) in storage 148-2 becomes corrupted and does not enable use of vendor software application 178-2, client 165-2 (or corresponding software code) can initiate a self-healing process to repair or replace the corrupted authorization information in storage 148-2 of client 165-2. For example, code associated with the software application can detect that the authorization resources in storage 148-2 are no longer valid because of possible corruption. In response to detecting corruption, the code associated with software application 178-2 (e.g., the code that accesses the license configuration file as a result of a user launching software application 178-2) can initiate retrieval of one or both of the authorization resources 397-1 and 199-2 again without having to notify the user at client 165-2 that the authorization resources in storage 148-2 were corrupted or that the corruption ever occurred. Accordingly, the bypass license configuration file 159-1 can support self-healing without intervention by the respective user.

Thus, in response to detecting that the authorization information in the tamper-resistant storage has been corrupted, embodiments herein enable a respective client to re-access its license configuration file to identify a respective source from which to obtain the authorization (e.g., activation certificate) again. In response to re-accessing the bypass license configuration file, the client identifies that the received bypass license configuration file is the respective source in which to obtain the authorization information. Thus, the client 165 re-obtains the authorization (e.g., activation certificate) from the license configuration file for storage in the tamper-resistant storage.

Repair of the corrupted authorization information enables the respective user at client 165-2 to use the information in storage 148-2 to operate the software application 178-2 again without having to be burdened with a respective re-registration process as discussed above. In other words, this is yet another convenience afforded by the Master Exception license and use of a bypass license configuration file 159.

Figure 4:
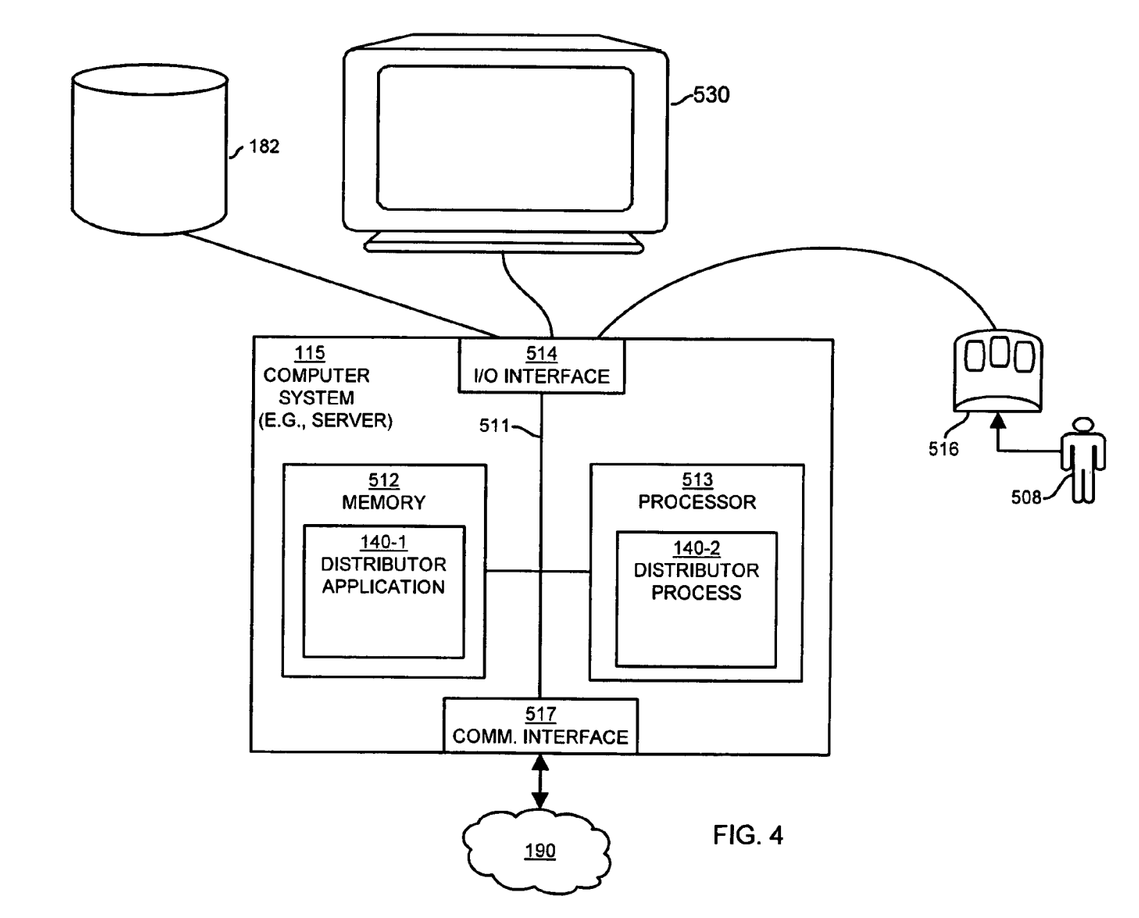
FIG. 4 is an example of a computer environment and corresponding computer system supporting distribution of different types of license configuration files according to embodiments herein.

FIG. 4 is a block diagram of a computer environment illustrating an example architecture of a respective computer system 115 for implementing distributor 140 (e.g., distributor application 140-1 and/or distributor process 140-2) according to embodiments herein. As previously discussed, server 260 can be configured to operate based on a similar type of computer architecture.

Computer system 115 can be a computerized device such as a personal computer, workstation, portable computing device, console, network terminal, processing device, network device, etc.

As shown, computer system 115 of the present example includes an interconnect 511 that couples a memory system 512, a processor 513, I/O interface 514, and a communications interface 517. I/O interface 514 provides connectivity to peripheral devices 516 (if such devices are present) such as a keyboard, mouse (e.g., selection tool 116), display screens (e.g., display medium 530), etc. User 508 (e.g., an administrator) can provide input commands with respect to computer system 115. Communications interface 515 enables computer system 115 to communicate over network 191 to retrieve and transmit information as previously discussed.

As shown, memory system 512 is encoded with distributor application 140-1 that supports distribution of license configuration files as discussed above and as discussed further below. Distributor application 140-1 can be embodied as software code such as data and/or logic instructions (e.g., code stored in the memory or on another computer readable medium such as a disk) that supports processing functionality according to different embodiments described herein. During operation of one embodiment, processor 513 accesses memory system 512 via the use of interconnect 511 in order to launch, run, execute, interpret or otherwise perform the logic instructions of the distributor application 140-1. Execution of the distributor application 140-1 produces processing functionality in distributor process 140-2. In other words, the distributor process 140-2 represents one or more portions of the distributor application 140-1 performing within or upon the processor 513 in the computer system 110.

It should be noted that, in addition to the distributor process 140-2 that carries out method operations as discussed herein, other embodiments herein include the distributor application 140-1 itself (i.e., the un-executed or non-performing logic instructions and/or data). The distributor application 140-1 may be stored on a computer readable medium (e.g., a repository) such as a floppy disk, hard disk or in an optical medium. According to other embodiments, the distributor application 140-1 can also be stored in a memory type system such as in firmware, read only memory (ROM), or, as in this example, as executable code within the memory system 512 (e.g., within Random Access Memory or RAM).

In addition to these embodiments, it should also be noted that other embodiments herein include the execution of the distributor application 140-1 in processor 513 as the distributor process 140-2. Thus, those skilled in the art will understand that the computer system 110 can include other processes and/or software and hardware components, such as an operating system that controls allocation and use of hardware resources.

Functionality supported by computer system 115 and, more particularly, functionality associated with distributor application 140-1 and distributor process 140-2 will now be discussed via flowcharts in FIGS. 5 through 7. For purposes of the following discussion in FIGS. 5-7, the distributor 140 (e.g., distributor application 140-1 and/or distributor process 140-2) of computer system 110 generally performs steps in the flowcharts.

Note that there will be some overlap with respect to concepts discussed above for FIGS. 1 through 4. Also, note that the steps in the below flowcharts need not always be executed in the order shown.

Figure 5:
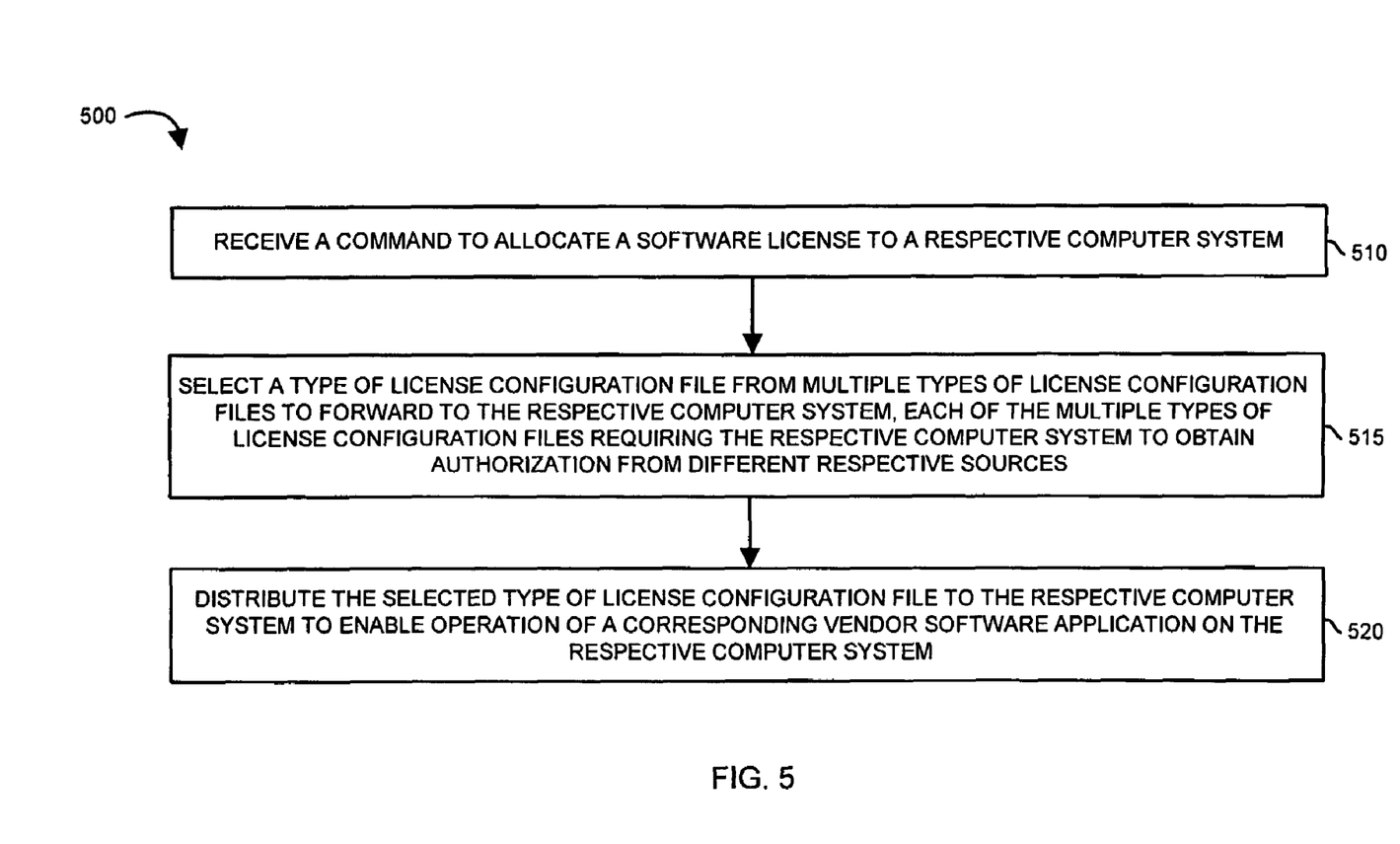
FIG. 5 is an example flowchart illustrating a method for facilitating distribution of different types of software licenses from a distributor according to embodiments herein.

FIG. 5 is a flowchart 500 illustrating a technique for allocating different types of software licenses according to embodiments herein. In step 510, the distributor 140 receives a command from a network administrator to allocate a certain type of software license to a respective computer system.

In step 515, the distributor 140 selects an appropriate type of license configuration file from multiple types of license configuration files to forward to the respective computer system depending on a type of license to be distributed to the respective computer system. Each of the multiple types of license configuration files can require the respective computer system to obtain authorization from different respective sources.

In step 520, the distributor 140 distributes the selected type of license configuration file (depending on the type of license allocate for a respective user) to the respective computer system to enable operation of a corresponding vendor software application on the respective computer system.

Figure 6:
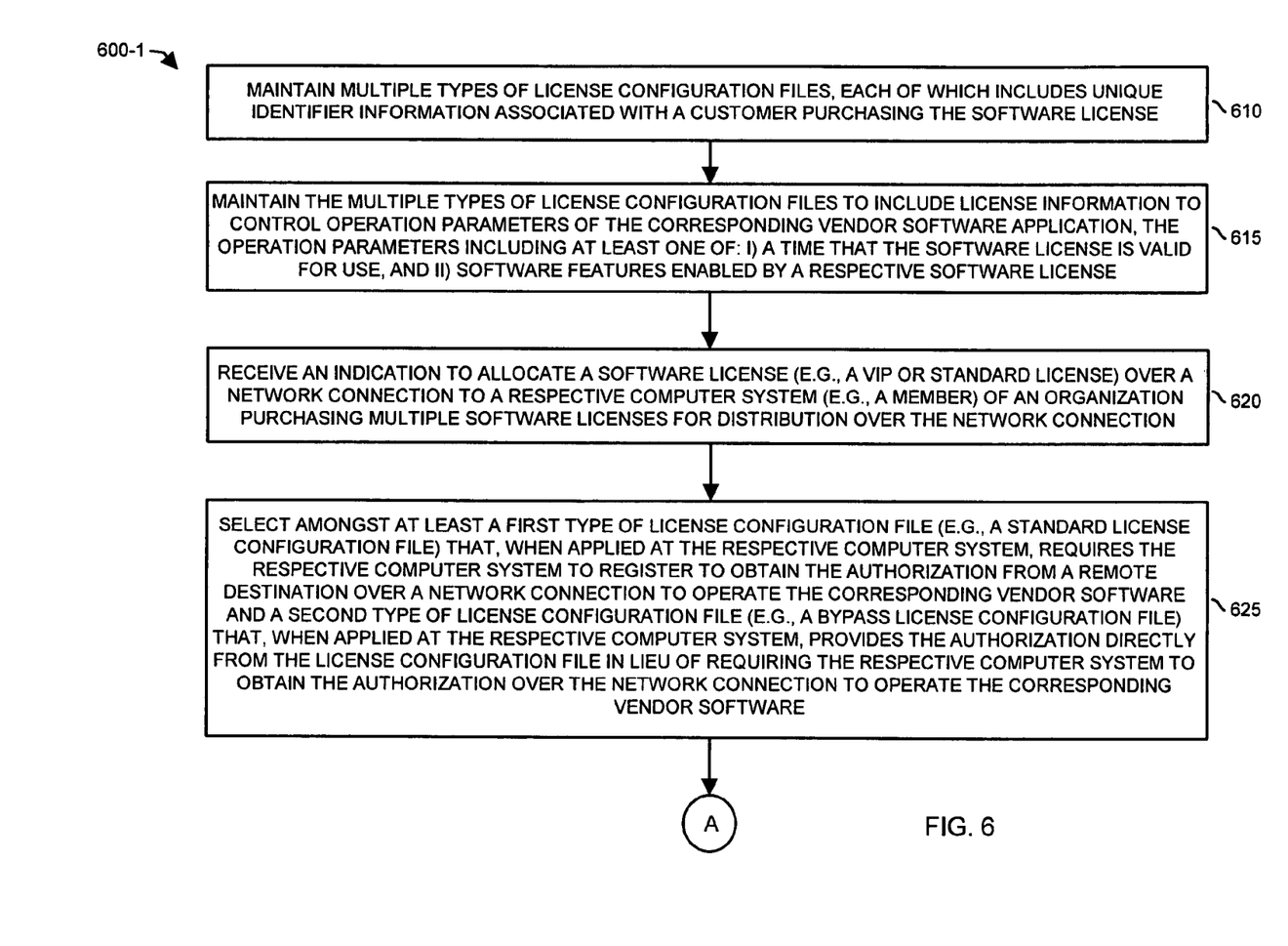
FIGS. 6 and 7 combine to form an example flowchart illustrating more specific techniques of allocating different types of software licenses according to embodiments herein.
Figure 7:
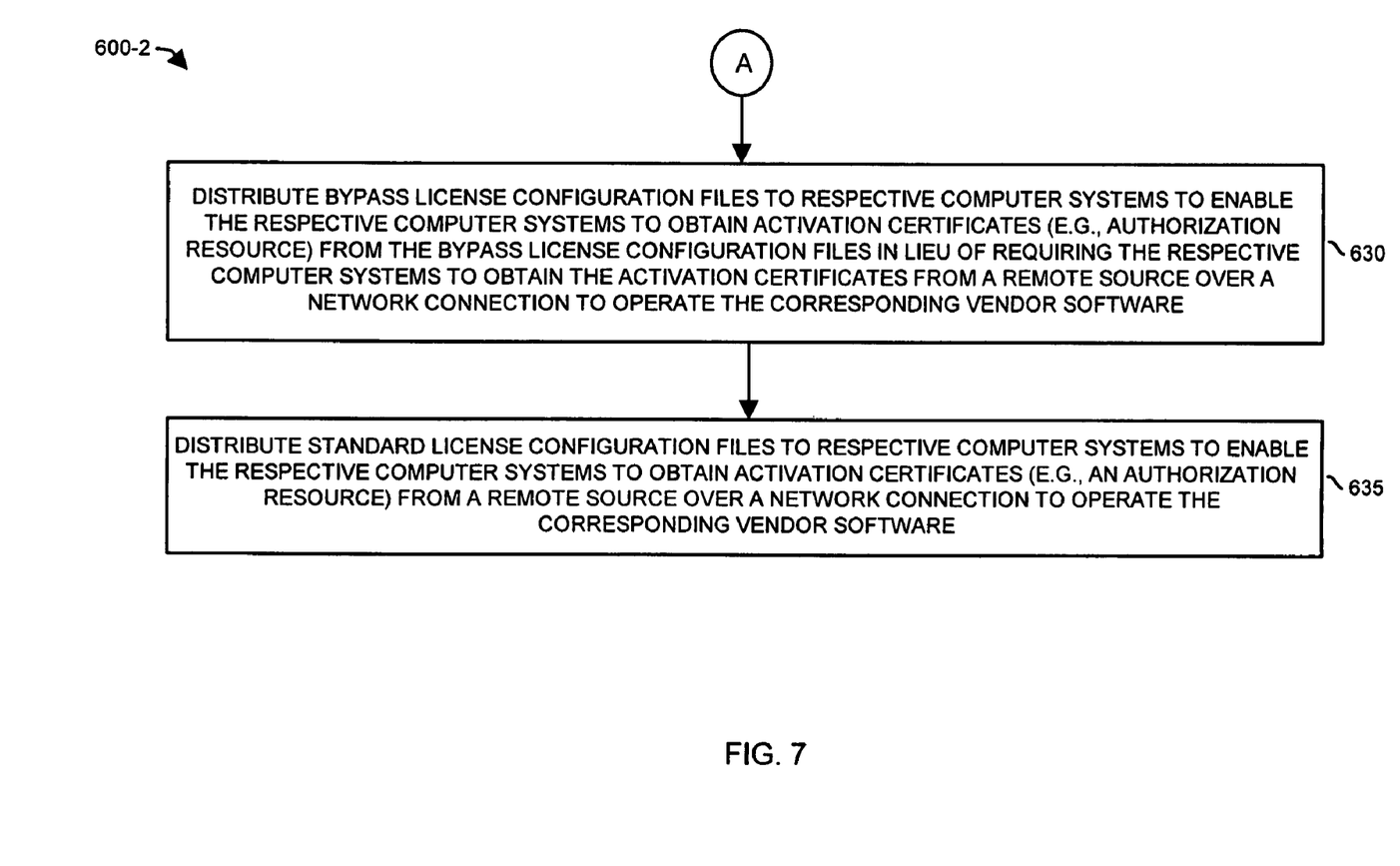

FIGS. 6 and 7 combine to form a flowchart 600 illustrating more specific techniques associated with embodiments herein. Note that according to the present example embodiment, the steps in flowcharts 600-1 and 600-2 (collectively, flowchart 600) are carried out by a processing entity such as distributor 140. However, the entity (e.g., computer system, combination of computer systems, server, etc.) that executes these operational steps below can vary depending on the configuration.

In step 610, the distributor 140 maintains multiple types of license configuration files including one or more bypass license configuration files 159 and one or more standard license configuration files 158. The license configuration files can include unique identifier information specifying a customer that purchases respective software licenses.

In step 615, the distributor 140 maintains the multiple types of license configuration files in repository 182 to include license information to control operation parameters of the corresponding vendor software application, the operation parameters including at least one of: i) a time that the software license is valid for use, and ii) software features enabled by a respective software license. In other words, when forwarded to a respective client, the software application can use the information in the license configuration file to identify what features to enable and, if applicable, how long.

In step 620, the distributor 140 receives an indication to allocate a software license (e.g., a Master Exception or standard license) over a network connection to a respective computer system such as a member of an organization purchasing multiple software licenses for distribution.

In step 625, the distributor 140 selects amongst at least a first type of license configuration file (e.g., a standard license configuration file 158) that, when applied at the respective computer system, requires the respective computer system to register to obtain the authorization from a remote destination (e.g., server 260) over a network connection to operate the corresponding vendor software and a second type of license configuration file (e.g., a bypass license configuration file 159) that, when applied at the respective computer system, provides the authorization directly from the license configuration file in lieu of requiring the respective computer system to obtain the authorization over the network connection to operate the corresponding vendor software.

In step 630, the distributor 140 distributes bypass license configuration files 159 to respective computer systems (e.g., clients 165) to enable the respective computer systems to obtain activation certificates (e.g., authorization resource) from the bypass license configuration files 159 in lieu of requiring the respective computer systems to obtain the activation certificates from a remote source (e.g., server 260) over a network connection to operate the corresponding vendor software.

Figure 8:
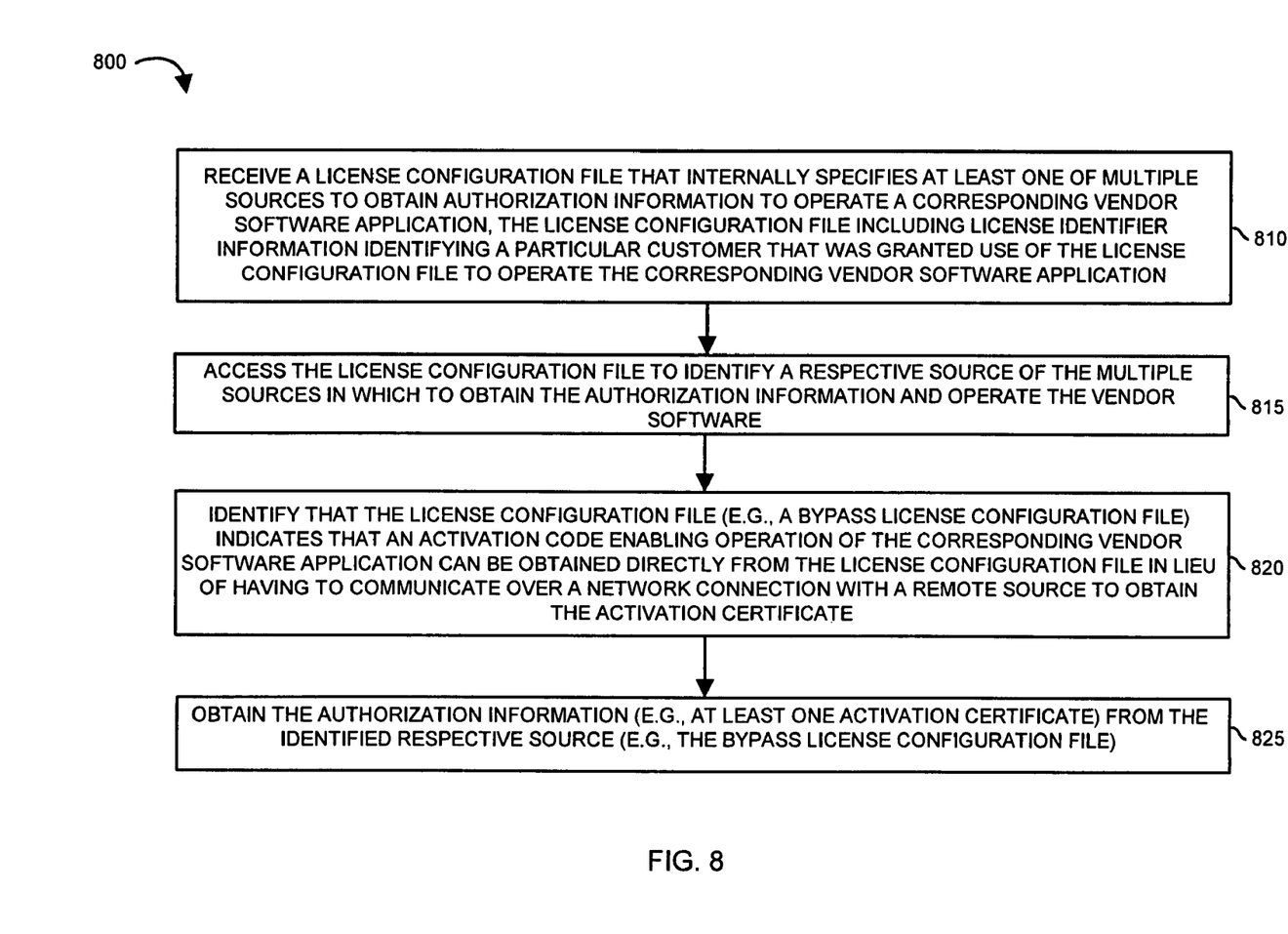
FIG. 8 is a flowchart illustrating an example of utilizing a received license configuration file according to embodiments herein.

In step 635, the distributor 140 distributes standard license configuration files 158 to respective computer systems (e.g., clients) to enable the respective computer systems to obtain activation certificates (e.g., an authorization resource) from a remote source (e.g., server 260) over a network connection to operate the corresponding vendor software FIG. 8 is a flowchart 800 illustrating a technique for utilizing a respective license configuration file at a client according to embodiments herein.

In step 810, a user and/or computer system such as client 165-2 receives a license configuration file that internally specifies one or more sources to obtain authorization information to operate a corresponding vendor software application. The license configuration file 159-1 can include license identifier information identifying a particular customer that was granted use of the license configuration file to operate the corresponding vendor software application.

In step 815, the client 165-2 accesses the license configuration file to identify a respective source in which to obtain the authorization information to operate the vendor software.

In step 820, the client 165-2 identifies that the license configuration file (e.g., a bypass license configuration file 159-1) indicates that an activation code enabling operation of the corresponding vendor software application can be obtained directly from the license configuration file in lieu of having to communicate over a network connection with a remote source (e.g., server 260) to obtain the activation certificate.

In step 825, the client 165-2 obtains the authorization resources (e.g., at least one activation certificate) from the identified respective source (e.g., from within the bypass license configuration file 159-1).

Note again that techniques herein are well suited for facilitating distribution of different types of licenses. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A computer-implemented method in which a computer system initiates execution of instructions retrieved from computer storage, the computer-implemented method comprising:
   receiving a command to allocate a software license to a respective computer system;
   selecting a type of license configuration file from multiple types of license configuration files to forward to the respective computer system, each of the multiple types of license configuration files requiring the respective computer system to obtain authorization from different respective sources, the multiple types of license configuration files including a first type of license configuration file and a second type of license configuration file, the first type of license configuration file requiring that the authorization be obtained from a remote source over a network connection to operate corresponding vendor software, the second type of license configuration file including the authorization to alleviate the respective computer system from having to obtain the authorization over the network connection from the remote source to operate the corresponding vendor software; and
   distributing the selected type of license configuration file to the respective computer system to enable operation of the corresponding vendor software application on the respective computer system.

2. A computer-implemented method as in claim 1, wherein receiving the command includes receiving an indication to distribute the software license over a network connection to a member of an organization purchasing multiple software licenses for distribution over the network connection.

3. A computer-implemented method as in claim 1 further comprising:
   maintaining at least one of the multiple types of license configuration files to include unique identifier information associated with a customer purchasing the software license to operate the corresponding vendor software application on the respective computer system.

4. A computer-implemented method as in claim 1 further comprising
   prior to distributing the selected type of license configuration file, maintaining the selected type of license configuration file to include license information limiting operation parameters of the corresponding vendor software application.

5. A computer-implemented method as in claim 4, wherein limiting operation parameters includes limiting at least one parameter selected from the group consisting of: i) a time that the software license is valid for use, and ii) software features enabled by the software license.

6. A computer-implemented method as in claim 1 further comprising:
   maintaining the second type of license configuration file to include unique identifier information associated with a customer purchasing the software license.

7. A computer-implemented method as in claim 1, wherein distributing the selected type of license configuration file to the respective computer system includes forwarding the second type of license configuration file to the respective computer system to enable the respective computer system to obtain an activation certificate from the selected type of license configuration file in lieu of requiring the respective computer system from having to obtain the activation certificate from the remote source over the network connection to operate the corresponding vendor software, the activation certificate being stored in the second type of license configuration file to enable operation of the corresponding vendor software by the respective computer system.

8. A computer program product including a computer-readable storage medium having instructions stored thereon for processing data information, such that the instructions, when carried out by a processing device, cause the processing device to perform operations of:
   receiving a command to allocate a software license to a respective computer system;
   selecting a type of license configuration file from multiple types of license configuration files to forward to the respective computer system, each of the multiple types of license configuration files requiring the respective computer system to obtain authorization from different respective sources, the multiple types of license configuration files including a first type of license configuration file and a second type of license configuration file, the first type of license configuration file requiring that the authorization be obtained from a remote source over a network connection to operate corresponding vendor software, the second type of license configuration file including the authorization to alleviate the respective computer system from having to obtain the authorization over the network connection from the remote source to operate the corresponding vendor software; and
   distributing the selected type of license configuration file to the respective computer system to enable operation of the corresponding vendor software application on the respective computer system.

9. A computer program product as in claim 8, wherein receiving the command includes receiving an indication to distribute the software license over a network connection to a member of an organization purchasing multiple software licenses for distribution over the network connection.

10. A computer program product as in claim 8 further supporting operations of:
    maintaining at least one of the multiple types of license configuration files to include unique identifier information associated with a customer purchasing the software license to operate the corresponding vendor software application on the respective computer system.

11. A computer program product as in claim 8 further supporting operations of:
    prior to distributing the selected type of license configuration file, maintaining the selected type of license configuration file to include license information limiting operation parameters of the corresponding vendor software application.

12. A computer program product as in claim 11, wherein limiting operation parameters includes limiting at least one parameter selected from a group consisting of: i) a time that the software license is valid for use, and ii) software features enabled by the software license.

13. A computer program product as in claim 8 further supporting operations of:
    maintaining the second type of license configuration file to include unique identifier information associated with a customer purchasing the software license.

14. A computer program product as in claim 8, wherein distributing the selected type of license configuration file to the respective computer system includes forwarding the second type of license configuration file to the respective computer system to enable the respective computer system to obtain an activation certificate from the selected type of license configuration file in lieu of requiring the respective computer system to obtain the activation certificate from a remote source over a network connection to operate the corresponding vendor software.

15. A computer system comprising:
a processor;
a memory unit that stores instructions associated with an application executed by the processor; and
the instructions when executed by the processor causing the processor to perform operations of:
receiving a command to allocate a software license to a respective computer system;
selecting a type of license configuration file from multiple types of license configuration files to forward to the respective computer system, each of the multiple types of license configuration files requiring the respective computer system to obtain authorization from different respective sources, the multiple types of license configuration files including a first type of license configuration file and a second type of license configuration file, the first type of license configuration file requiring that the authorization be obtained from a remote source over a network connection to operate corresponding vendor software, the second type of license configuration file including the authorization to alleviate the respective computer system from having to obtain the authorization over the network connection from the remote source to operate the corresponding vendor software; and
distributing the selected type of license configuration file to the respective computer system to enable operation of the corresponding vendor software application on the respective computer system.

16. A computer-implemented method as in claim 7 further comprising:
configuring the second type of license configuration file to include the activation certificate; and
configuring the second type of license configuration file to indicate, upon being accessed by the respective computer system, that the activation certificate is available to the respective computer system directly from the second type of license configuration file in lieu of the respective computer system having to communicate over the network connection with the remote source to obtain the activation certificate.

17. A computer-implemented method as in claim 16 further comprising:
via the second type of license configuration file distributed to the respective computer system, enabling the respective computer system to retrieve and use the activation certificate from the second type of license configuration file for operating the corresponding vendor software without requiring registration by a user of the respective computer system, the first type of license configuration file requiring registration with a remote server to obtain an activation certificate to use the corresponding vendor software.

18. A computer-implemented method as in claim 1 further comprising:
branding the second type of license configuration file with specific identification information of a particular customer granted use of corresponding vendor software; and
utilizing the specific identification information in the second license configuration file to identify misuse of the activation certificate by unauthorized users.

19. A computer-implemented method as in claim 1, wherein the second type of license configuration file authorizes a free, limited term software license for use by the respective computer system without requiring the respective computer system to register with the remote source to obtain the activation certificate to operate the corresponding vendor software.

20. A computer-implemented method as in claim 1 further comprising:
configuring each of the first type of license configuration file and the second type of license configuration file to include bit information, bit information in the first type of license configuration file specifying that an activation code for operating the corresponding vendor software is available from the remote source over the network connection, bit information in the second type of license configuration file specifying that an activation code for operating the corresponding vendor software is available from the second type of license configuration file.

21. The computer-implemented method as in claim 1 further comprising:
branding the second type of license configuration file with specific identifier information, the specific identifier specifying a particular customer granted use of corresponding vendor software via an authorization code in the second type of license configuration file distributed to the respective computer system; and
enabling the second type of license configuration file distributed to the respective computer system to be copied by the particular customer for use of the authorization code by multiple computer systems operated by the particular customer.

22. The computer-implemented method as in claim 1 further comprising:
maintaining the second type of license configuration file to include license information to control operation parameters of the corresponding vendor software application, the operation parameters specifying features enabled by the authorization;
wherein the selected type of license is the second type of license configuration file for distribution to the respective computer system, the second type of license being a bypass license in which the respective computer system obtains the authorization from the second type of license configuration file; and
wherein the respective computer system is a first computer system operated by a customer purchasing licenses for use of the corresponding vendor software, the computer-implemented method further comprising:
initiating distribution of the first type of license to a second computer system operated by the customer, the first type of license requiring that the second computer system obtain authorization from the remote source over the network to operate the corresponding vendor software.

23. The computer-implemented method as in claim 22, wherein the second type of license configuration file provides the authorization to the respective computer system without requiring a respective user of the respective computer system to provide personal information to obtain the authorization for use of the corresponding vendor software; and wherein the first type of license configuration file requires a user at the second computer system to register by providing personal information to the remote source in order to obtain authorization to use the corresponding vendor software at the second computer system.

24. The computer-implemented method as in claim 23 further comprising:

branding the second type of license configuration file with specific identifier information, the specific identifier information specifying a particular customer that has been granted use of corresponding vendor software via an authorization code in the second type of license configuration file distributed to the respective computer system; and enabling the second type of license configuration file distributed to the respective computer system to be copied by the particular customer for use of the authorization code by multiple computer systems operated by the particular customer.

* * * * *